(12) United States Patent
Kim et al.

(10) Patent No.: US 8,422,599 B2
(45) Date of Patent: Apr. 16, 2013

(54) DEVICE AND METHOD OF ESTIMATING SYMBOL USING SECOND ORDER DIFFERENTIAL PHASE VECTOR

(75) Inventors: Chung Sup Kim, Daejeon (KR); Soo Ho Sohn, Daejeon (KR); Ki Cheol Tae, Daejeon (KR); Hyeong Geun Park, Daejeon (KR); Yong-Seok Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 301 days.

(21) Appl. No.: 12/971,189

(22) Filed: Dec. 17, 2010

(65) Prior Publication Data

US 2011/0150064 A1    Jun. 23, 2011

(30) Foreign Application Priority Data

Dec. 17, 2009  (KR) .................. 10-2009-0125878
Feb. 5, 2010  (KR) .................. 10-2010-0010831

(51) Int. Cl.
*H04L 27/06*      (2006.01)

(52) U.S. Cl.
USPC .......................................... 375/340

(58) Field of Classification Search .................. 375/340, 375/147, 232
See application file for complete search history.

(56) References Cited

U.S. PATENT DOCUMENTS

| 4,061,978 | A | * | 12/1977 | Motley et al. ................ 375/232 |
| 5,568,249 | A | * | 10/1996 | Kawamura et al. .......... 356/3.14 |
| 2004/0013169 | A1 | * | 1/2004 | Kanemoto et al. ............ 375/147 |
| 2008/0161660 | A1 | * | 7/2008 | Arneson et al. ............... 600/302 |

FOREIGN PATENT DOCUMENTS

| JP | 2005-045329 | A | 2/2005 |
| JP | 2008-211760 | A | 9/2008 |
| KR | 2002-0053233 | A | 7/2002 |
| KR | 2009-0043761 | A | 5/2009 |

* cited by examiner

*Primary Examiner* — Jaison Joseph
(74) *Attorney, Agent, or Firm* — Rabin & Berdo, P.C.

(57) ABSTRACT

Provided is a method of estimating a symbol. The method may include deriving phase components of input data, applying a second order differentiation to the phase components to obtain a second order differential phase vector, and estimating symbols corresponding to the input data using the second order differential phase vector.

16 Claims, 5 Drawing Sheets

DEVICE AND METHOD OF ESTIMATING SYMBOL USING SECOND ORDER DIFFERENTIAL PHASE VECTOR

CROSS-REFERENCE TO RELATED APPLICATIONS

This application claims the benefit of Korean Patent Applications No. 10-2009-0125878, filed on Dec. 17, 2009, and No. 10-2010-0010831, filed on Feb. 5, 2010, in the Korean Intellectual Property Office, the disclosures of which are incorporated herein by reference.

BACKGROUND

1. Field of the Invention

The present invention relates to an apparatus and method of compensating for a frequency offset and estimating a symbol, and more particularly, to a technique using a second order differential phase vector in a process of compensating for the frequency offset and estimating the symbol.

2. Description of the Related Art

In a general wireless communication system, a receiver may require a function of compensating for a frequency offset in a process of restoring a signal. There exist various algorithms to compensate for the frequency offset. In a case of using a predetermined algorithm to compensate for the frequency offset, a result of the predetermined algorithm inevitably contains an error. Due to the error, a performance of the receiver may deteriorate.

A large number of algorithms used to compensate for the frequency offset may have a highly complex metric. Accordingly, a device and method for estimating and compensating for the frequency offset accurately having a low complex metric is desired.

SUMMARY

An aspect of the present invention provides an apparatus and method of automatically compensating for a frequency offset by performing a second order differentiation with respect to phase components of input data to compensate for the frequency offset accurately, and having a low complex metric.

Another aspect of the present invention also provides an apparatus and method of determining a modulation scheme of input data using a variance of a second order differential phase vector without performing a predetermined processing with respect to the variance.

According to an aspect of the present invention, there is provided a method of estimating a symbol, including deriving phase components of input data, applying a second order differentiation to the phase components to obtain a second order differential phase vector, and estimating symbols corresponding to the input data using the second order differential phase vector.

The applying may include deriving a first order differential phase vector with respect to the phase components using a smoothing window that equalizes the phase components, and differentiating the first order differential phase vector to obtain the second order differential phase vector.

The applying may include using an $n^{th}$ phase component and at least two phase components adjacent to the $n^{th}$ phase component among the phase elements to obtain an $n^{th}$ element included in the second order differential phase vector.

The estimating may include determining a modulation scheme of the input data using a variance of the second order differential phase vector.

The determining may include determining the modulation scheme of the input data by comparing the variance of the second order differential phase vector with a predetermined value.

The method of estimating a symbol may further including detecting an amplitude vector including amplitude components of the input data, wherein, the estimating may include estimating the symbols using the amplitude vector and the second order differential phase vector.

The estimating may include estimating the symbols using a combination of the amplitude vector and the second order differential phase vector.

The estimating may include adjusting the amplitude vector based on the second order differential phase vector, and estimating the symbols using the adjusted amplitude vector and the second order differential phase vector.

According to another aspect of the present invention, there is provided a method of compensating for a frequency offset, including deriving phase components of input data, deriving a first order differential phase vector with respect to the phase components using a smoothing window that equalizes the phase components, and differentiating the first order differential phase vector to automatically compensate for a frequency offset of the input data.

The method of compensating for a frequency offset may further include determining a modulation scheme of the input data using a variance of the second order differential phase vector that is generated by differentiating the first order differential phase vector.

According to still another aspect of the present invention, there is provided a symbol estimation apparatus including a phase component derivation unit to derive phase components of input data, a second order differentiator to apply a second order differentiation to the phase components to obtain a second order differential phase vector, and a symbol estimator to estimate symbols corresponding to the input data using the second order differential phase vector.

The second order differentiator may include a first differentiator to generate a first order differential phase vector with respect to the phase components using a smoothing window that equalizes the phase components, and a second differentiator to differentiate the first order differential phase vector to obtain the second order differential phase vector.

The second differentiator may use an $n^{th}$ phase component and at least two phase components adjacent to the $n^{th}$ phase component among the phase components to obtain an $n^{th}$ element included in the second order differential phase vector.

The symbol estimator may include a modulation scheme determining unit to determine a modulation scheme of the input data using a variance of the second order differential phase vector.

The modulation scheme determining unit may determine the modulation scheme of the input data by comparing the variance of the second order differential phase vector with a predetermined value.

The symbol estimation apparatus may further include an amplitude vector detector to detect an amplitude vector including amplitude components of the input data, wherein the symbol estimator may estimate the symbols using the amplitude vector and the second order differential phase vector.

According to embodiments of the present invention, there is provided an apparatus and method of automatically compensating for a frequency offset by performing a second order differentiation with respect to phase components of input data to compensate for the frequency offset accurately, and having a low complex metric.

According to embodiments of the present invention, there is provided an apparatus and method of determining a modulation scheme of input data using a variance of a second order differential phase vector without performing a predetermined processing with respect to the variance.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
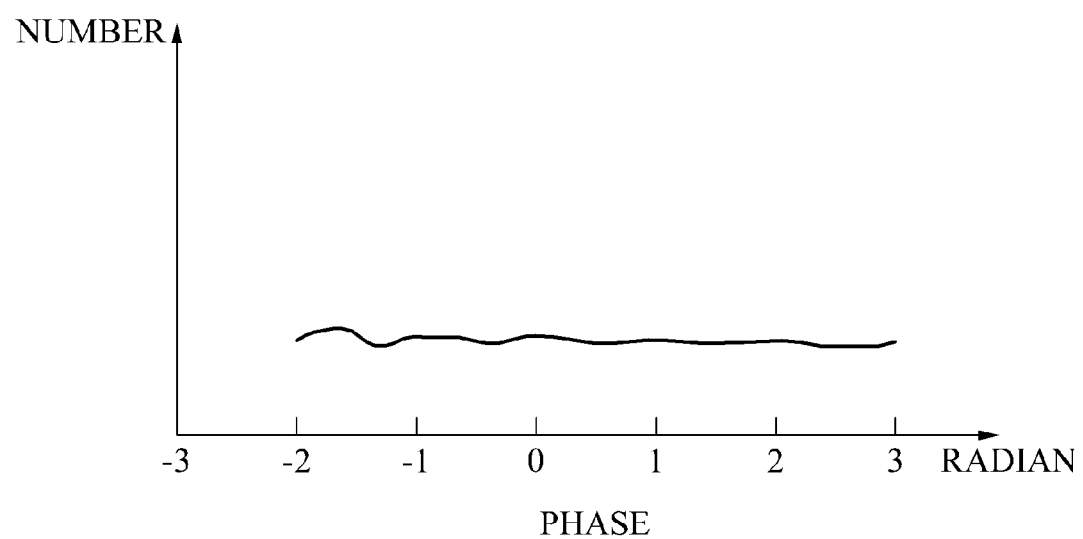
FIG. 1 is a graph illustrating an example of phase components of input data according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a graph illustrating an example of phase components of input data according to an embodiment of the present invention.

Referring to FIG. 1, phase components of input data may be assumed to be distributed as illustrated in FIG. 1. Here, since a changing velocity of the phase components may correspond to a frequency, the frequency of the input data may be expressed by performing a first order differentiation with respect to the phase components.

Hereinafter, the phase components of the input data are indicated by θ, and $\theta_n$ indicates a phase component at an $n^{th}$ time instance.

Figure 2:
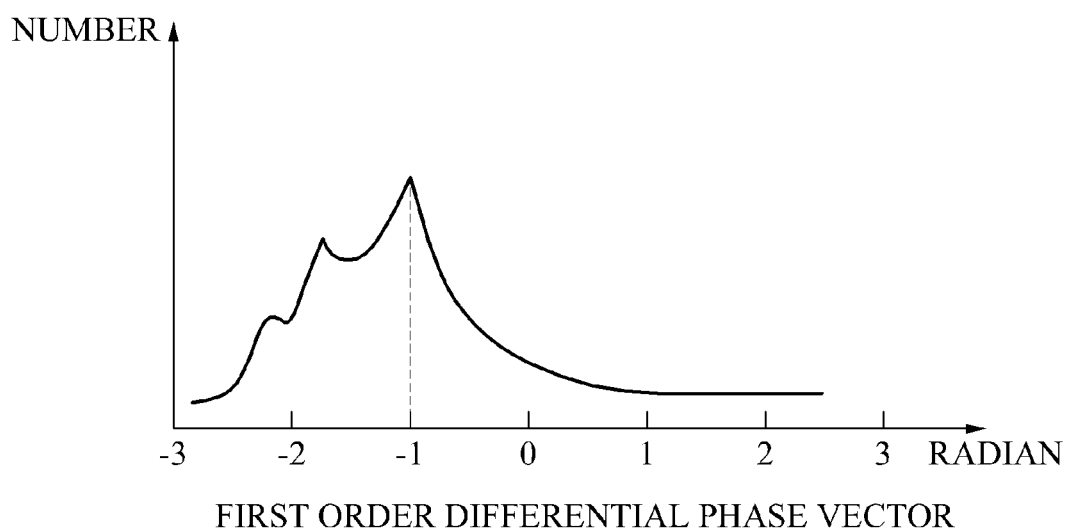
FIG. 2 is a graph illustrating a first order differential phase vector generated by first order differentiating the phase components of FIG. 1.

FIG. 2 is a graph illustrating a first order differential phase vector generated by first order differentiating the phase components of FIG. 1.

Referring to the first order differential phase vector illustrated in FIG. 2, a position where a maximum value of the first order differential phase vector exists may correspond to a frequency offset. Here, the first order differential phase vector may be generated by performing a first order differentiation with respect to the phase components.

Since the maximum value of the first order differential phase vector may exist at 1 radian, it may be assumed that the frequency offset corresponding to approximately 1 radian exists.

Figure 3:
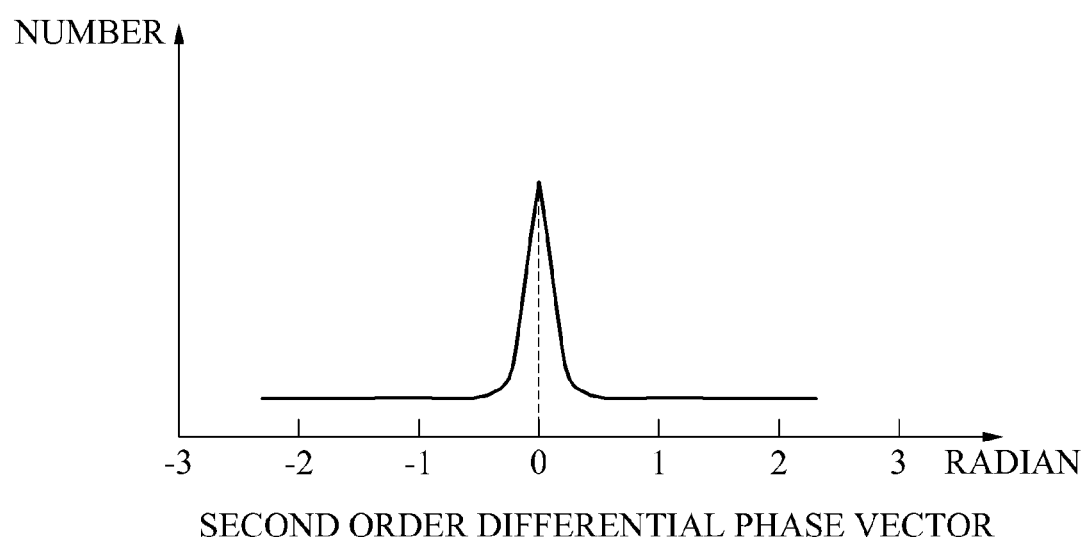
FIG. 3 is a graph illustrating a second order differential phase vector generated by second order differentiating the phase components of FIG. 1.

FIG. 3 is a graph illustrating a second order differential phase vector generated by second order differentiating the phase components of FIG. 1.

Referring to the second order differential phase vector illustrated in FIG. 3, it may be verified that a position where a maximum value of the second order differential phase vector exists is at approximately "0" radians. Here, the second order differential phase vector may be generated by further differentiating a first order differential phase vector.

Since the maximum value of the second order differential phase vector exists at approximately "0" radians, resolving the second order differential phase vector with respect to the phase components of input data may correspond to automatically compensating for a frequency offset. Thus, according to an aspect of the present invention, the frequency offset may be automatically compensated for by resolving the second order differential phase vector without using an algorithm to estimate and compensate for the frequency offset.

Hereinafter, an operation according to an aspect of the present invention will be further described.

An $n^{th}$ element included in a second order differential phase vector may be expressed by the following Equation 1.

$$\frac{d^2\theta_n}{dt^2} = \left(\frac{\theta_{n+2} - 2*\theta_{n+1} + \theta_n}{\Delta t}\right) \quad \text{[Equation 1]}$$

Referring to Equation 1, the $n^{th}$ element included in the second order differential phase vector may be resolved based on an $n^{th}$ phase component $\theta_n$ and at least two phase components $\theta_{n+1}$ and $\theta_{n+2}$ adjacent to the $n^{th}$ phase component $\theta_n$.

According to an aspect of the present invention, the second order differential phase vector may be resolved by further differentiating a first order differential phase vector after resolving the first order differential phase vector. Here, a smoothing window $h_n$ that equalizes the phase components may be applied to derive the first order differential phase vector with respect to the phase components as given by the following Equation 2.

$$\frac{d\theta_n}{dt} = h_n\left(\frac{\theta_{n+2} - \theta_n}{\Delta t * 2}\right) \quad \text{[Equation 2]}$$

Here, the first order differential phase vector may be used for estimating a frequency offset. However, according to an aspect of the present invention, instead of estimating and compensating for the frequency offset using the first order differential phase vector, the second order differential phase vector may be calculated to automatically compensate for the frequency offset.

As illustrated in FIG. 2, a position of the frequency offset may be verified using the first order differential phase vector. As illustrated in FIG. 3, calculating the second order differential phase vector may correspond to automatically compensating for the frequency offset.

Figure 4:
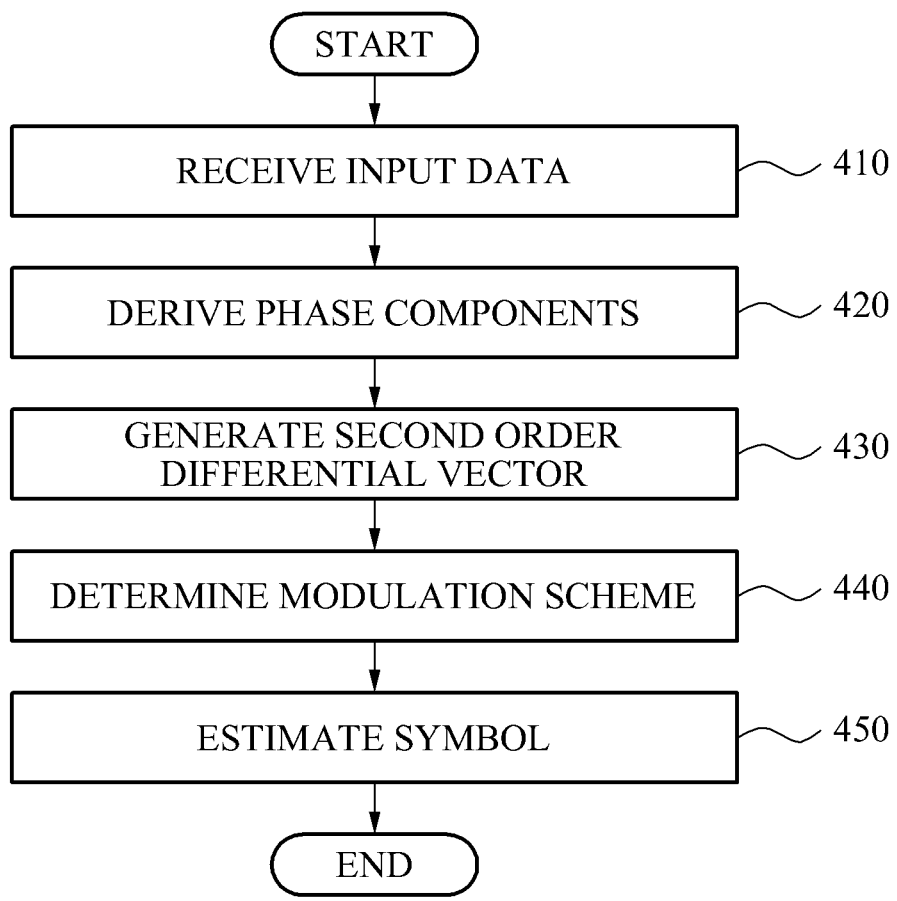
FIG. 4 is a flowchart illustrating a method of estimating a symbol according to an embodiment of the present invention.

FIG. 4 is a flowchart illustrating a method of estimating a symbol according to an embodiment of the present invention.

Referring to FIG. 4, the method of estimating a symbol according to an embodiment of the present invention may receive input data in operation 410.

The symbol estimation method may derive phase components of the input data in operation 420.

In the present invention, after resolving a real part and an imaginary part of the input data, the phase components of the input data may be derived. Although not illustrated in FIG. 4, an amplitude vector including amplitude components of the input data may be detected.

The symbol estimation method may generate a second order differential vector in operation 430.

As described with reference to Equation 1, an $n^{th}$ element included in the second order differential phase vector may be obtained based on an $n^{th}$ phase component and at least two phase components adjacent to the $n^{th}$ phase component among the phase components.

In this instance, the second order differential phase vector may be generated by further differentiating a first order differential phase vector after deriving the first order, differential phase vector using a smoothing window that equalizes the phase components.

The symbol estimation method may determine a modulation scheme of the input data using a variance of the second order differential phase vector in operation 440. The modulation scheme of the input data may be determined by comparing the variance of the second order differential phase vector with a predetermined value.

For example, when the variance of the second order differential phase vector is greater than approximately 0.15, the input data may be determined to have been modulated according to an on-off keying (OOK) scheme. A modulation scheme by which the input data has been modulated may be determined depending on whether the variance of the second order differential phase vector is greater than 0.03 at a signal-to-noise ratio (SNR) of 6 dB or more. Here, the modulation scheme may be a phase shift keying (PSK) scheme or a frequency shift keying (FSK) scheme.

In particular, since all the elements belonging to the second order differential phase vector may exist in an interval of $-\pi$ to $\pi$, a predetermined normalization process with respect to the second order differential phase vector for resolving the variation may not be required. Thus, according to the present invention, the modulation scheme of the input data may be effectively determined with a small amount of calculations.

The symbol estimation method may estimate symbols corresponding to the input data based on the determined modulation scheme and the second order differential phase vector in operation 450. Also, the symbols may be accurately estimated using the amplitude vector and the second order differential phase vector.

A combination of the amplitude vector and the second order differential phase vector may be expressed by the following Equation 3.

$$\tilde{E} = [A_1 e^{\theta_1}, A_2 e^{\theta_2}, \ldots, A_n e^{\theta_n}]$$ [Equation 3]

In Equation 3, $A_1$, $A_2$, and $A_n$ indicate elements of the amplitude vector, and $\theta_1$, $\theta_2$, and $\theta_n$ indicate elements of the second order differential phase vector.

In the present invention, the symbols may be estimated based on Equation 3. Also, Equation 4 may be calculated based on Equation 3, and the symbols may be estimated based on Equation 4.

$$E_{new\_i} = \left[ \sum_{i=1}^{d1} A_i e^{\theta_{d1}}, \ldots, \sum_{i=n-1}^{dn} A_i e^{\theta_{dn}} \right]$$ [Equation 4]

In Equation 4, $\theta_d$ indicates an element having a value equal to or greater than a predetermined phase value among elements belonging to the second order differential phase vector.

After the amplitude vector is modulated based on the second order differential phase vector, a new vector $E_{new\_i}$ may be calculated according to Equation 4. The symbols may be estimated based on the new vector $E_{new\_i}$.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Figure 5:
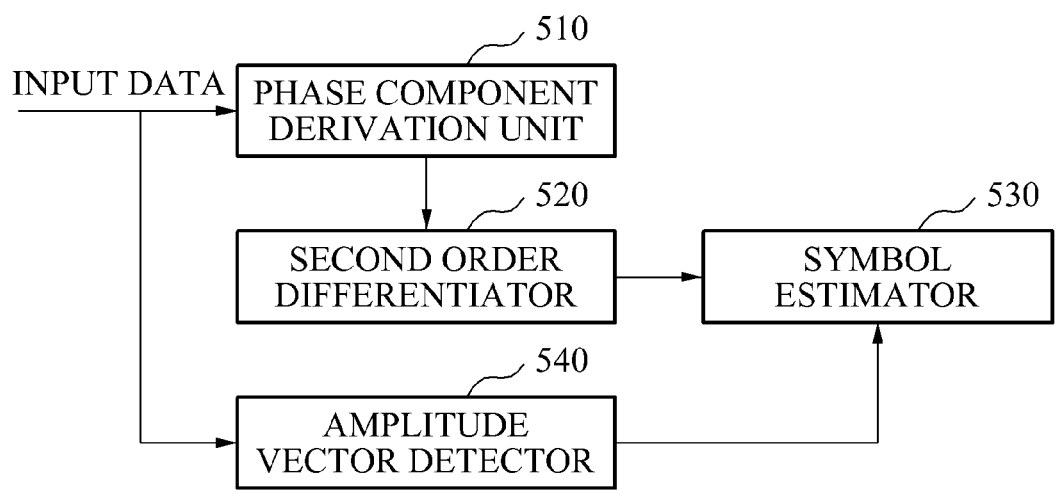
FIG. 5 is a block diagram illustrating a symbol estimation apparatus according to an embodiment of the present invention.

FIG. 5 is a block diagram illustrating a symbol estimation apparatus according to an embodiment of the present invention.

Referring to FIG. 5, the symbol estimation apparatus according to an embodiment of the present invention may include a phase component derivation unit 510, a second order differentiator 520, a symbol estimator 530, and an amplitude vector detector 540.

The phase component derivation unit 510 may derive phase components of input data.

The second order differentiator 520 may apply a second order differentiation to the phase components to obtain a second order differential phase vector. Although not illustrated in FIG. 5, the second order differentiator 520 may include a first differentiator to generate a first order differential phase vector with respect to the phase components using a smoothing window that equalizes the phase components, and may include a second differentiator to differentiate the first order differential phase vector to obtain the second order differential phase vector.

The symbol estimator 530 may estimate symbols corresponding to the input data using the second order differential phase vector.

Here, the amplitude vector detector 540 may detect an amplitude vector including amplitude components of the input data, and the symbol estimator 530 may estimate the symbols using the amplitude vector and the second order differential phase vector.

Although not illustrated in FIG. 5, the symbol estimator 530 may include a modulation scheme determining unit to determine a modulation scheme of the input data using a variance of the second order differential phase vector.

The above descriptions with reference to FIG. 1 through FIG. 4 may be applied to the symbol estimation apparatus of FIG. 5, and further descriptions will be omitted.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A symbol estimation apparatus comprising:
   a phase component derivation unit to derive phase components of input data;
   a second order differentiator to apply a second order differentiation to the phase components to obtain a second order differential phase vector; and
   a symbol estimator to estimate symbols corresponding to the input data using the second order differential phase vector.

2. The symbol estimation apparatus of claim 1, wherein the second order differentiator comprises:
   a first differentiator to generate a first order differential phase vector with respect to the phase components using a smoothing window that equalizes the phase components; and
   a second differentiator to differentiate the first order differential phase vector to obtain the second order differential phase vector.

3. The symbol estimation apparatus of claim 1, wherein the second differentiator uses an $n^{th}$ phase component and at least two phase components adjacent to the $n^{th}$ phase component among the phase components to obtain an $n^{th}$ element included in the second order differential phase vector.

4. The symbol estimation apparatus of claim 1, wherein the symbol estimator comprises:
   a modulation scheme determining unit to determine a modulation scheme of the input data using a variance of the second order differential phase vector.

5. The symbol estimation apparatus of claim 4, wherein the modulation scheme determining unit determines the modulation scheme of the input data by comparing the variance of the second order differential phase vector with a predetermined value.

6. The symbol estimation apparatus of claim 1, further comprising:
   an amplitude vector detector to detect an amplitude vector comprising amplitude components of the input data,
   wherein the symbol estimator estimates the symbols using the amplitude vector and the second order differential phase vector.

7. A method of estimating a symbol, comprising:
   deriving phase components of input data;
   applying a second order differentiation to the phase components to obtain a second order differential phase vector; and
   estimating symbols corresponding to the input data using the second order differential phase vector.

8. The method of claim 7, wherein the applying comprises:
   deriving a first order differential phase vector with respect to the phase components using a smoothing window that equalizes the phase components; and
   differentiating the first order differential phase vector to obtain the second order differential phase vector.

9. The method of claim 7, wherein the applying comprises:
   using an $n^{th}$ phase component and at least two phase components adjacent to the $n^{th}$ phase component among the phase elements to obtain an $n^{th}$ element included in the second order differential phase vector.

10. The method of claim 7, wherein the estimating comprises:
    determining a modulation scheme of the input data using a variance of the second order differential phase vector.

11. The method of claim 10, wherein the determining comprises determining the modulation scheme of the input data by comparing the variance of the second order differential phase vector with a predetermined value.

12. The method of claim 7, further comprising:
    detecting an amplitude vector comprising amplitude components of the input data,
    wherein, the estimating comprises estimating the symbols using the amplitude vector and the second order differential phase vector.

13. The method of claim 12, wherein the estimating comprises estimating the symbols using a combination of the amplitude vector and the second order differential phase vector.

14. The method of claim 12, wherein the estimating comprises adjusting the amplitude vector based on the second order differential phase vector, and estimating the symbols using the adjusted amplitude vector and the second order differential phase vector.

15. A method of compensating for a frequency offset, comprising:
    deriving phase components of input data;
    deriving a first order differential phase vector with respect to the phase components using a smoothing window that equalizes the phase components; and
    differentiating the first order differential phase vector to automatically compensate for a frequency offset of the input data.

16. The method of claim 15, further comprising:
    determining a modulation scheme of the input data using a variance of the second order differential phase vector that is generated by differentiating the first order differential phase vector.

* * * * *